(12) United States Patent
Kimura

(10) Patent No.: US 8,794,771 B2
(45) Date of Patent: Aug. 5, 2014

(54) PROJECTOR INCLUDING A CONNECTION MECHANISM ROTATABLY CONNECTING A PROJECTOR MAIN BODY TO AN IMAGE OUTPUT DEVICE

(75) Inventor: Tetsushi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 303 days.

(21) Appl. No.: 12/144,121

(22) Filed: Jun. 23, 2008

(65) Prior Publication Data

US 2009/0015803 A1  Jan. 15, 2009

(30) Foreign Application Priority Data

Jul. 13, 2007  (JP) ................ 2007-184689

(51) Int. Cl.
*G03B 21/14*  (2006.01)
*G03B 21/22*  (2006.01)
*H04N 9/31*  (2006.01)

(52) U.S. Cl.
CPC .............. *G03B 21/14* (2013.01); *G03B 21/145* (2013.01); *G03B 21/22* (2013.01); *H04N 9/3141* (2013.01)
USPC .......................................... 353/119; 353/122

(58) Field of Classification Search
CPC ...... G03B 21/22; G03B 21/145; G03B 21/14; H04N 9/3141
USPC ............... 353/100, 101, 119, 122; 248/183.2, 248/346.04, 349.1
See application file for complete search history.

(56) References Cited

U.S. PATENT DOCUMENTS

| 4,401,287 | A | * | 8/1983 | Moeser ........................... 248/425 |
| 5,794,419 | A | * | 8/1998 | Cohen ............................... 54/47 |
| 7,286,341 | B1 | * | 10/2007 | Chang et al. ............. 361/679.09 |
| 2004/0207179 | A1 | * | 10/2004 | Sacco et al. .................... 280/623 |
| 2005/0088621 | A1 | * | 4/2005 | Ikeuchi ........................... 353/15 |
| 2005/0190344 | A1 | * | 9/2005 | Lin ................................. 353/71 |
| 2006/0238724 | A1 | * | 10/2006 | Trivedi .......................... 353/119 |

FOREIGN PATENT DOCUMENTS

| JP | 01-105286 A | 4/1989 |
| JP | 04-061385 U | 5/1992 |
| JP | 05-021567 | 3/1993 |
| JP | 05-176262 | 7/1993 |
| JP | 2002-209161 A | 7/2002 |
| JP | 2005-077912 A | 3/2005 |
| JP | 2005-181634 | 7/2005 |
| JP | 2005-229357 | 8/2005 |
| JP | 2006-72037 | 3/2006 |
| JP | 2007-66365 | 3/2007 |

* cited by examiner

*Primary Examiner* — Francis M Legasse, Jr.
*Assistant Examiner* — Bao-Luan Le
(74) *Attorney, Agent, or Firm* — ALG Intellectual Property, LLC

(57) ABSTRACT

A projector includes a projector main body for enlargedly projecting the optical image, an image output device for outputting the image information to the projector main body, and a connection mechanism interposing between the projector main body and the image output device, and for connecting the projector main body and the image output device to each other, wherein the projector main body and the image output device are disposed so as to be opposed to each other, the connection mechanism includes a plate-like member fixed to either one of the projector main body and the image output device, and a rotatable member fixed to the plate-like member and attached to the other of the projector main body and the image output device, and for making the plate-like member rotatable relatively to the other of the projector main body and the image output device.

13 Claims, 9 Drawing Sheets

PROJECTOR INCLUDING A CONNECTION MECHANISM ROTATABLY CONNECTING A PROJECTOR MAIN BODY TO AN IMAGE OUTPUT DEVICE

BACKGROUND

1. Technical Field

The present invention relates to a projector.

2. Related Art

In the past, there has been known a projector provided with a projector main body for modulating a light beam emitted from a light source in accordance with input image information to form an optical image and then enlargedly projecting the optical image thus formed, and an image output device for outputting the image information to the projector main body (see e.g., JP-A-2006-72037 (Patent Document 1)).

In the projector described in Patent Document 1, the projector main body is mounted on the image output device (e.g., a Digital Versatile Desk (DVD) player) via a partitioning member. Further, on the rear face of the DVD player there are disposed a DVD input section for inputting a DVD and a speaker for outputting the sound.

Incidentally, such a projector integrally composed of the image output device and the projector main body is mainly used inside a room in a house or the like, and the user of the projector uses the projector located at various positions such as the front side, the rear side, the right, and the left of the user in accordance with the size of the room, the size of the screen, or the installation location.

However, in the projector described in Patent Document 1, since the position of the DVD input section is fixed to the opposite side of the projection side of the projector, there has been caused a problem that the position of the operation section becomes far from the user in the case in which the projector is located, for example, on the rear side, the right, or the left of the user, thus the operationality of the projector is lowered.

SUMMARY

An advantage of some aspects of the invention is to provide a projector for making it possible to freely change the position of the operation section in accordance with the installation conditions, and thus enhancing the freedom of installation.

A projector according to an aspect of the invention includes a projector main body for modulating a light beam emitted from a light source in accordance with input image information to form an optical image, and enlargedly projecting the optical image thus formed, an image output device for outputting the image information to the projector main body, and a connection mechanism interposing between the projector main body and the image output device, and for connecting the projector main body and the image output device to each other, wherein the projector main body and the image output device are disposed so as to be opposed to each other, the connection mechanism includes a plate-like member fixed to either one of the projector main body and the image output device, and a rotatable member fixed to the plate-like member and attached to the other of the projector main body and the image output device, and for making the plate-like member rotatable relatively to the other of the projector main body and the image output device.

It should be noted here that as the image output device, there can be cited a DVD player, a video player, a television tuner, and so on.

According to such a configuration, since the connection mechanism is provided with the plate-like member and the rotatable member, it becomes possible to make the projector main body and the image output device rotatable relatively to each other. In other words, for example, the projector main body is disposed on the upper side, the image output device is disposed on the lower side so as to be opposed to each other, the plate-like member is fixed to the projector main body, and the rotatable member is attached to the image output device, thereby making it possible to rotate the projector main body disposed on the upper side relatively to the image output device disposed on the lower side in the condition in which the projector is installed.

Therefore, in the case in which the operation section such as the DVD insertion section and the display section for displaying the operation condition of the DVD and so on are provided to the image output device, the user of the projector can install the projector so that the face of the image output device on which the operation section and the display section are disposed faces towards the user of the projector while the projection direction of the optical image faces towards the projection surface such as a screen. In other words, the user of the projector can freely change the positions of the operation section and the display section in accordance with the installation condition of the projector.

In this aspect of the invention, it is preferable that the other of the projector main body and the image output device is provided with an attaching side opening section having a substantially circular shape disposed at a position at which the rotatable member is attached, and the rotatable member has a substantially circular cross-sectional shape, and is inserted into the attaching side opening section.

According to such a configuration, since the rotatable member has a substantially circular cross-sectional shape, and is inserted in the attaching side opening section provided to the other of the projector main body and the image output device, the plate-like member can be rotatable along the attaching side opening section with a simple configuration.

In this aspect of the invention, it is preferable that the rotatable member has a substantially cylindrical shape, the plate-like member is provided with a member side opening section formed at a position opposed to the attaching side opening section, and the one of the projector main body and the image output device is provided with a fixed side opening section formed at a position opposed to the attaching side opening section.

According to such a configuration, since the projector main body and the image output device are communicated with each other via each of the opening sections and the rotatable member, the signal cables such as an image cable for transmitting the image information output from the image output device to the projector main body can be connected to the projector main body and the image output device via the rotatable member. Therefore, the user of the projector can use the projector without connecting the signal cables to the outside such as the image cable for transmitting the image information output from the image output device to the projector main body. Further, since it can be eliminated to wire around the signal cables to the outside the projector, space reduction can be achieved. Further, since the signal cables are connected via the space communicated by the each of the opening sections and the rotatable member, the projector main body can smoothly be rotated without entwining the signal cables.

In this aspect of the invention, it is preferable that the rotatable member includes a rotatable member main body having a substantially circular cross-sectional shape, and an extension section disposed on a tip side of an insertion direction of the rotatable member main body to the attaching side opening section so as to extend outward, and the connection mechanism includes a plurality of divided ring members obtained by dividing a planar ring member having an inside diameter substantially equal to an outside diameter of the rotatable member main body, the plurality of divided ring members have contact with the rotatable member main body by combined with each other in a condition in which the rotatable member is inserted into the attaching side opening section, and is fixed to a periphery of the attaching side opening section.

According to such a configuration, since the rotatable member includes the rotatable member main body and the extension section, and the plurality of divided ring members have contact with the rotatable member main body by being combined with the each other in the condition in which the rotatable member is inserted into the attaching side opening section, and are fixed to the periphery of the attaching side opening section, the extension section of the rotatable member has contact with the divided ring members when the rotatable member is pulled out on the opposite side to the insertion direction to the attaching side opening section. Therefore, the rotatable member can be prevented from dropping out of the attaching side opening section. Further, since the rotatable member main body is fixed to the plate-like member, and at the same time, held between the divided ring members, the plate-like member can be made rotatable along the divided ring members.

In this aspect of the invention, it is preferable that a connector to which a cable is connected from outside is provided, and the projector main body and the image output device are disposed so as to be stacked in a vertical direction, and the connector is provided to one of the projector main body and the image output device disposed on the lower side of the projector.

According to such a configuration, the connector to which the cable from the outside is connected such as the inlet connector for the alternating current (AC) power cable is provided to the projector main body or the image output device disposed on the lower side. Therefore, in for example the projector main body is disposed upper side and the image output device is disposed lower side so as to stack the projector main body and the image output device in the vertical direction, the projector main body can smoothly be rotated relatively to the image output device without entwining the cables.

In this aspect of the invention, it is preferable that a rotation stopping mechanism provided to the other of the projector main body and the image output device, and for stopping rotation of the plate-like member is further included, and the rotation stopping mechanism includes a plurality of stopper sections each having contact with the plate-like member to stop rotation of the plate-like member in a predetermined direction, and a reaction force application member for applying reaction force to the plate-like member in response to the plate-like member having contact with the stopper section, the reaction force being against the rotation in an opposite direction to the predetermined direction.

According to such a configuration, since the projector is provided with the rotation stopping mechanism, when the plate-like member has contact with the stopper section for stopping the rotation in a predetermined direction, the reaction force against the rotation in the reversed direction of the predetermined direction is applied to the plate-like member by the reaction force application member. Further, in order for rotating the plate-like member in the direction of getting away from the stopper section, it is required to apply the stronger force than the reaction force applied by the reaction force application member. In other words, the plate-like member can temporarily be fixed at predetermined positions by the stopper section and the reaction force application member.

Therefore, for example, in the case in which the operation section such as a DVD insertion section is provided to the image output device, by setting the temporarily fixing position to the first temporarily fixing position in which the face of the image output device provided with the operation section and the projection direction of the optical image are the same, and the second temporarily fixing position in which the face of the operation section and the projection direction are opposite to each other, the user of the projector can easily change the position of the operation section in accordance with the installation condition of the projector.

In other words, the user of the projector temporarily fixes the projector main body and the image output device at the first temporarily fixing position in the case in which the projector is disposed behind the user, and the user of the projector temporarily fixes the projector main body and the image output device at the second temporarily fixing position in the case in which the projector is disposed in front of the user, thereby making the position of the operation section in the image output device closer to the user, thus improving the operationality.

BRIEF DESCRIPTION OF THE DRAWINGS

The invention will now be described with reference to the accompanying drawings, wherein like numbers reference like elements.

DESCRIPTION OF EXEMPLARY EMBODIMENTS

An embodiment of the invention will hereinafter be explained with reference to the accompanying drawings.

Schematic Configuration of the Projector

Figure 1:
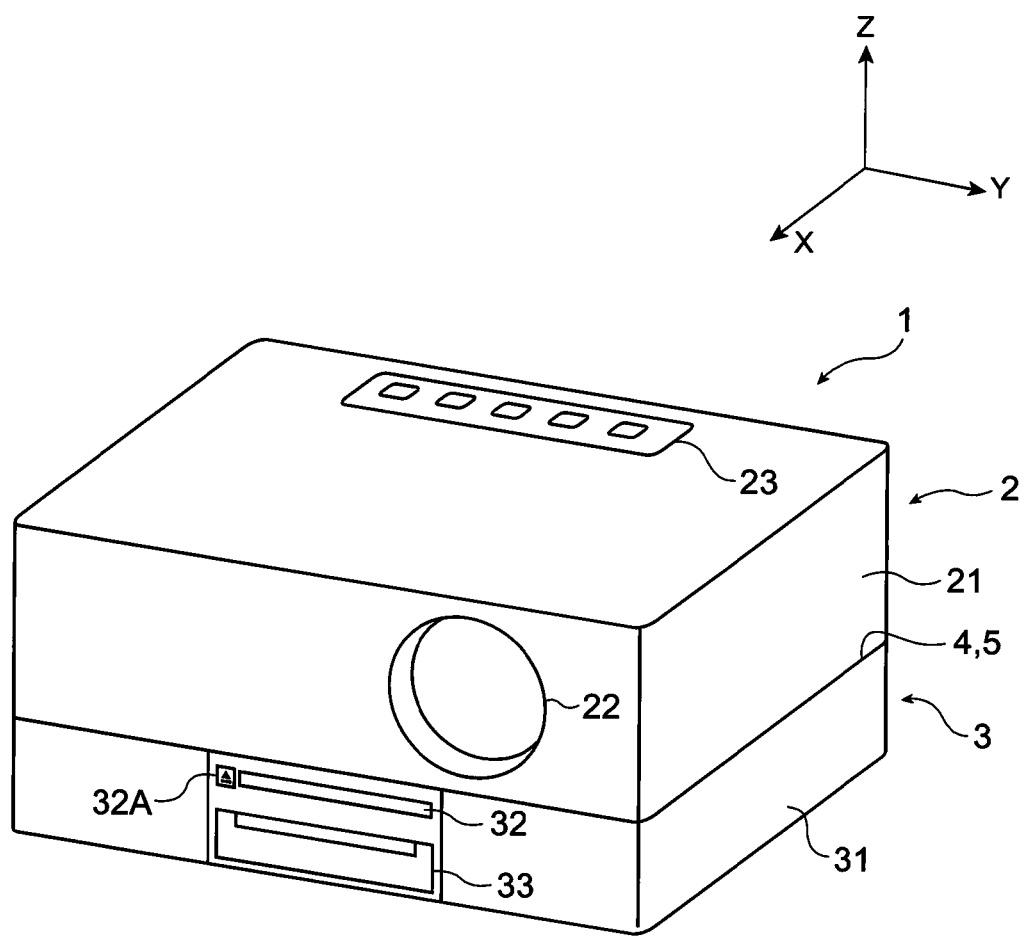
FIG. 1 is a perspective view of a projector according to an embodiment of the invention viewed from the front side thereof.
Figure 2:
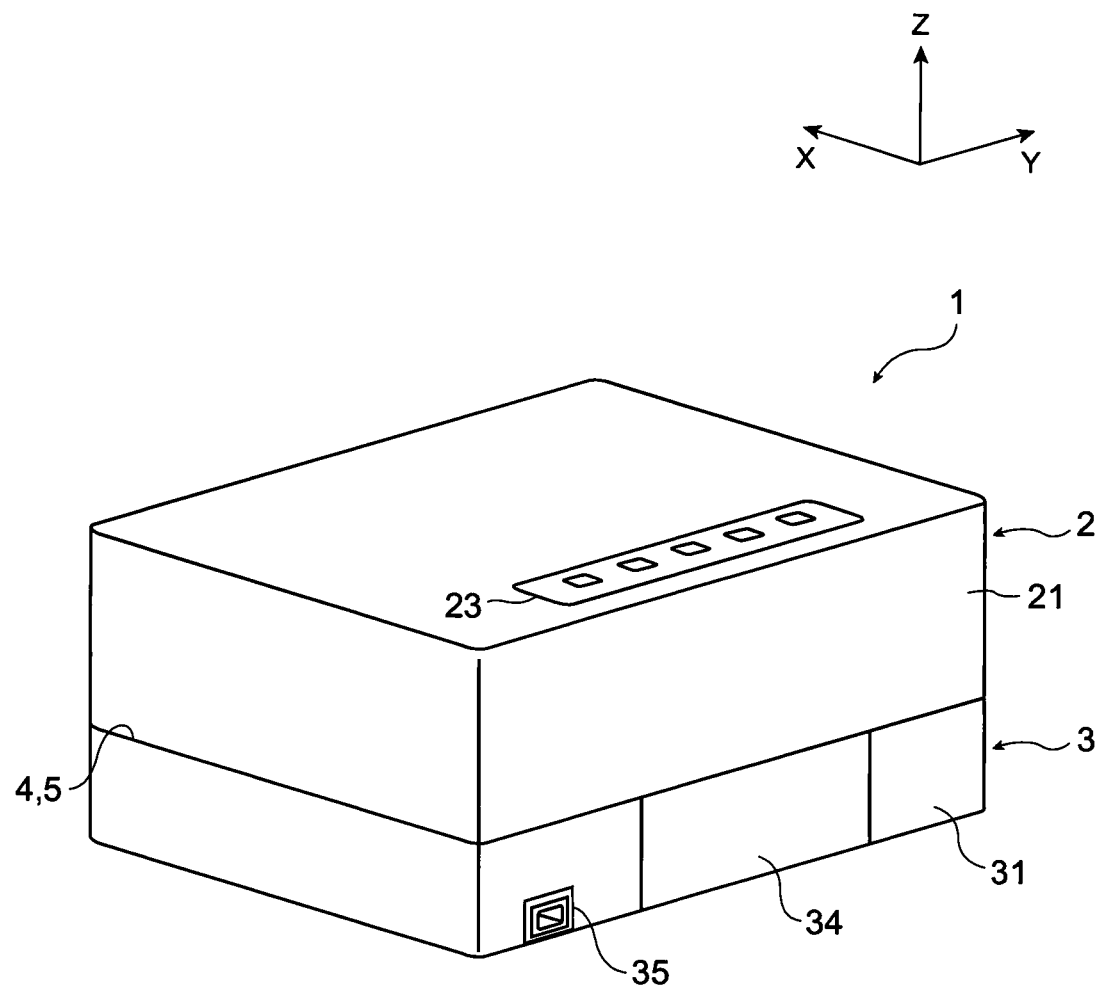
FIG. 2 is a perspective view of the projector according to the embodiment of the invention viewed from the rear side thereof.

FIG. 1 is a perspective view of the projector 1 viewed from the front side thereof, and FIG. 2 is a perspective view of the projector 1 viewed from the rear side thereof. It should be noted that in FIGS. 1 and 2, the direction from the rear side of the projector 1 towards the front side thereof is defined as an X-axis direction, and two directions perpendicular to the X-axis direction are defined as a Y-axis (horizontal axis) direction and a Z-axis (vertical axis) direction, respectively, for the sake of convenience of explanations. The same is applied to the drawings described below.

As shown in FIGS. 1 and 2, the projector 1 is provided with a projector main body 2 for modulating a light beam emitted from a light source in accordance with input image information to form an optical image, and then enlargedly projecting the optical image thus formed, a DVD player 3 for outputting the image information to the projector main body 2, a connection mechanism 4 for rotatably joining the projector main body 2 and the DVD player 3, and a rotation stopping mechanism 5 for stopping the rotation of the projector main body 2 and the DVD player 3.

As shown in FIGS. 1 and 2, the projector main body 2 is provided with an upper housing 21 formed to have a substantially cuboid shape and mounted on the upper side (+Z-axis direction side) of the DVD player 3, a projection lens 22 exposed in the front face (the surface on the +X-axis direction side) of the upper housing 21, and an operation panel 23 disposed in a rear section (in the −X-axis direction section) of the top face of the upper housing 21. The operation panel 23 is for performing operations such as starting and adjusting of the projector 1, and operations of the DVD player 3 such as playing and stopping. The DVD player 3 performs reproduction of the image information recorded on the recording medium inserted in the DVD player 3, stopping the reproduction, and so on in response to the operations of the operation panel 23 for DVD. It should be noted that the projection lens 22 will be explained later in detail.

The DVD player 3 as the image output device executes reproduction process on the recording medium such as DVD on which the image information is recorded as digital data, thereby outputting the image information and so on recorded on the recording medium to the projector main body 2 via a image cable (not shown). As shown in FIGS. 1 and 2, the DVD player 3 is disposed on the lower side (on the −Z-axis direction side) of the projector main body 2, and is provided with a lower housing 31 formed to have a substantially cuboid shape, a DVD insertion/removal port 32 disposed in substantially the center area of the front face of the lower housing 31, a DVD operation display section 33 disposed under the DVD insertion/removal port 32, and an interface cover 34, inlet connector 35 both disposed on the rear face (the surface on the −X-axis direction side) of the lower housing 31.

The DVD insertion/removal port 32 is a slot-in inlet section to which the recording medium such as DVD is inserted, and the DVD player 3 reproduces the image information and so on recorded on the recording medium inserted in the DVD insertion/removal port 32. Further, at a position laterally adjacent to the DVD insertion/removal port 32, there is attached an ejection button 32A for ejecting the recording medium.

The DVD operation display section 33 is a section for displaying the condition of the DVD player 3 such as playing or stopping, and the user can confirm the condition such as playing of the recording medium and stopping thereof by looking at the DVD operation display section 33.

Although omitted from the drawings, inside the interface cover 34, there are disposed various kinds of interface connectors such as an image input terminal for inputting the image information to the projector 1 from the outside, and the interface cover 34 protects these interface connectors. Further, by opening the interface cover 34, the various kinds of interface connectors can be used. It should be noted that the interface cover 34 can be eliminated.

The inlet connector 35 is a connector for connecting an AC power cable from the outside, and is exposed without being covered by the interface cover 34.

Specifically, the various kinds of interface connectors and the inlet connector 34 are provided to the DVD player 3, the lower part of the projector 1.

Figure 3:
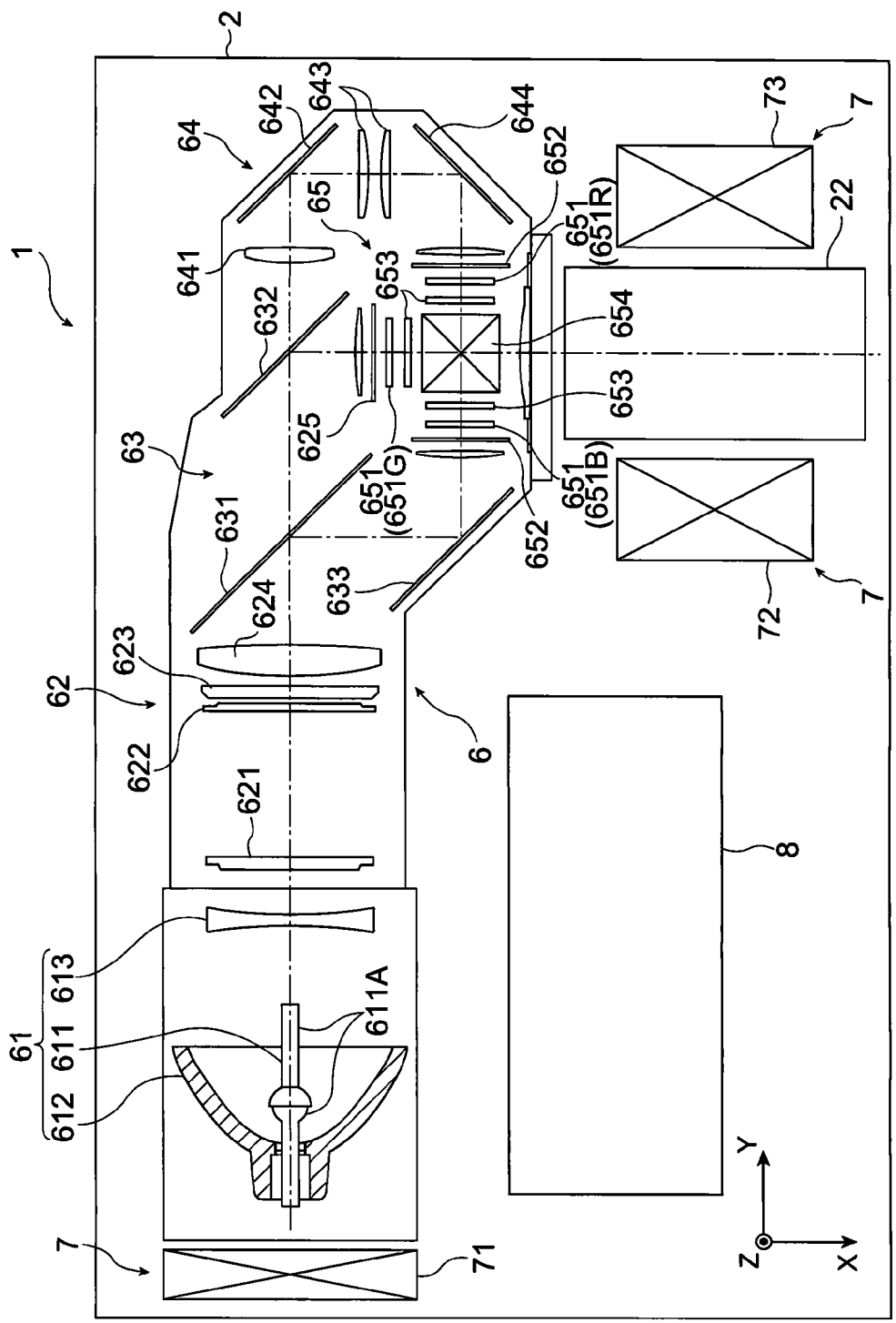
FIG. 3 is a diagram showing a schematic configuration of a projector main body according to the embodiment of the invention.

FIG. 3 is a diagram showing a schematic configuration of the projector main body 2.

As shown in FIG. 3, the projector main body 2 is provided with an image projection section 6, a cooling device 7, and a power supply device 8.

The image projection section 6 has a roughly L-shape, and is for forming an optical image based on the input image information to enlargedly project the optical image. The image projection section 6 is provided with a light source device 61, a lighting optical device 62, a color separator optical device 63, a relay optical device 64, an optical device 65, and a projection lens 22.

The light source device 61 is for emitting a light beam towards the lighting optical device 62. The light source device 61 is provided with a light source lamp 611 generating discharge emission between a pair of electrodes 611A, a principal reflecting mirror 612, and a collimator lens 613.

The light beam emitted from the light source lamp 611 is aligned in the emission direction to the front side of the light source device 61 and emitted as converging light beam by the principal reflecting mirror 612. Further, the converging light beam emitted by the principal reflecting mirror 612 is collimated by the collimator lens 613, and is emitted towards the lighting optical device 62.

It should be noted that although the principal reflecting mirror 612 is configured as an ellipsoidal reflector in the present embodiment, it can also be configured as a paraboloidal reflector for reflecting the light beam emitted from the light source lamp 611 while substantially collimating the light beam. In this case, the configuration of eliminating the collimator lens 613 can be adopted.

The lighting optical device 62 is provided with a first lens array 621, a second lens array 622, a polarization conversion element 623, and an overlapping lens 624. The light beam emitted from the light source device 61 is divided into a plurality of partial light beams by the first lens array 621, and each of the partial light beams is collected in the vicinity of the second lens array 622. Further, each of the partial light beams emitted from the second lens array 622 enters the entrance surface of the polarization conversion element 623 so that the center axis (the principal ray) becomes perpendicular to the entrance surface, and is emitted by the polarization conversion element 623 as a single type of linearly-polarized light beam. The plurality of partial light beams emitted from the polarization conversion element 623 as linearly-polarized light beams is overlapped on three liquid crystal panels 651, described later, of the optical device 65 via the overlapping lens 624.

The color separator optical device 63 is provided with two dichroic mirrors 631, 632 and a reflecting mirror 633, and separates the plurality of partial light beams emitted from the lighting optical device 62 into three colored light beams of red, green, and blue by the dichroic mirrors 631, 632 and the reflecting mirror 633.

The relay optical device 64 is provided with an entrance side lens 641, a relay lens 643, and reflecting mirrors 642, 644, and guides the colored light beam obtained by the color separator optical device 63, a red light beam, for example, to the liquid crystal panel 651R, described later, on the red light beam side of the optical device 65.

The optical device 65 modulates the incident light beam in accordance with the image information to form an optical image (a color image). The optical device 65 is provided with the three liquid crystal panels 651 (the liquid crystal panels of the red light beam side, the green light beam side, and the blue light beam side are respectively denoted as 651R, 651G, and 651B), entrance side polarization plates 652 disposed respectively on the preceding stages of the liquid crystal panels 651 in the light path, exit side polarization plates 653 disposed respectively on the latter stages of the liquid crystal panels 651 in the light path, and a cross dichroic prism 654.

The three entrance side polarization plates 652 transmit only the polarized light beam having the polarization direction substantially identical to the polarization direction to which the polarization direction of the single type of linearly-polarized light beam is aligned by the polarization conversion element 623 out of the colored light beams obtained by the color separator optical device 63, and absorb the other light beams.

The three liquid crystal panels 651 have a configuration of airtightly encapsulating liquid crystal as an electro-optic material between a pair of transparent glass plates, and each modulate the polarization direction of the polarized light beam emitted from the entrance side polarization plate 652 in response to the orientation condition being controlled in accordance with the input image information.

The three exit side polarization plates 653 transmits the polarized light beam with a predetermined direction out of the light beam emitted via the liquid crystal panel 651, and absorbs the rest of the light beam.

The cross dichroic prism 654 combines the modulated light beams of the respective colors emitted from the exit side polarization plates 653 to form the color image. The cross dichroic prism 654 has a substantially rectangular planar shape formed of four rectangular prisms bonded with each other, and on the interfaces on which the rectangular prisms are bonded with each other, there are formed two dielectric multilayer films. These dielectric multilayer films transmit the colored light beam emitted from the liquid crystal panel 651G and passing through the exit side polarization plate 653 while reflecting the colored light beams emitted from the liquid crystal panels 651R, 651B and passing through the exit side polarization plates 653. Thus, the colored light beams are combined to form the color image.

The projection lens 22 is configured as a combination lens in which a plurality of lenses is combined with each other, and enlargedly projects the color image formed by the cross dichroic prism 654 on the screen.

The cooling device 7 is for cooling the inside of the projector main body 2. The cooling device 7 is provided with a cooling fan 71 disposed on the opposite direction side (the −Y-axis direction side) to the direction of the light beam emission of the light source device 61, and cooling fans 72, 73 disposed on both sides (the both sides in the Y-axis direction) of the projection lens 22.

Each of the cooling fans 71 through 73 is driven with a predetermined drive voltage to cool various sections of the projector main body 2 including the light source device 61 and the projection lens 22.

The power supply device 8, which is attached in the front area (on the +X-axis direction side) of the light source device 61, converts the AC power supplied via the AC power cable connected to the inlet connector 35 into the DC power, and supplies the projector main body 2 and the DVD player 3 with the DC power.

Figure 4:
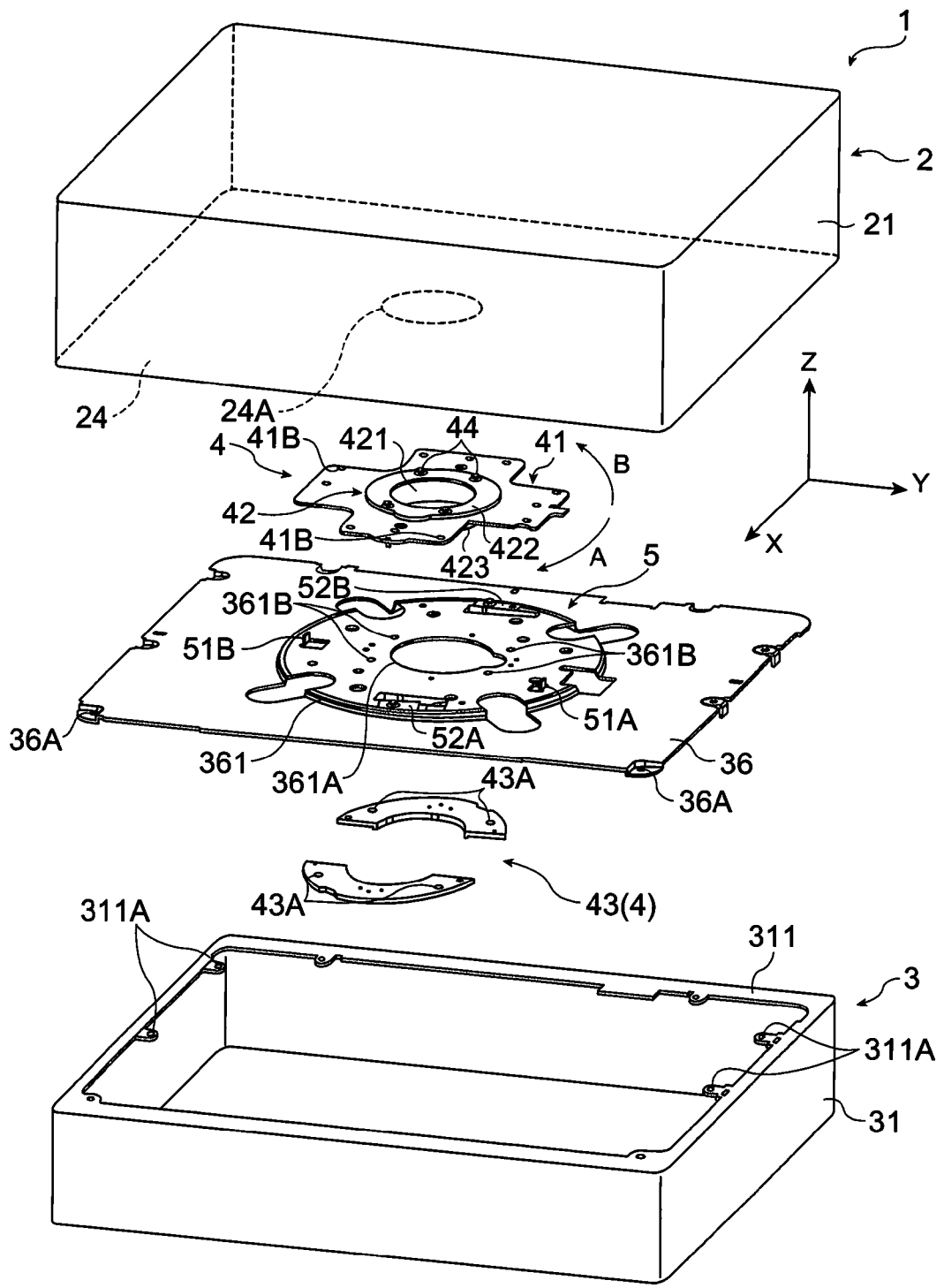
FIG. 4 is an exploded perspective view of the projector according to the embodiment of the invention viewed from the front side thereof.

FIG. 4 is an exploded perspective view of the projector 1 viewed from the front side thereof.

As shown in FIG. 4, the connection mechanism 4 is provided with a plate-like member 41 fixed to a bottom plate 24 of the projector main body 2, a rotatable member 42 fixed to the plate-like member 41 and attached rotatably to the top plate 36 of the DVD player 3, and a plurality of divided ring members 43 for attaching the rotatable member 42 to the top plate 36.

It should be noted that illustration of some sections such as the projection lens 22 (see FIG. 1) exposed from the upper housing 21 and the DVD insertion/removal port 32 (see FIG. 1) provided to the lower housing 31 is omitted from the drawing in FIG. 4.

The plate-like member 41 is a member shaped like a plate formed to have a cross-like shape in a plan view, and provided with four end sections substantially perpendicular to each other and extending in four directions. At substantially the center position of the plate-like member 41, there is fixed the rotatable member 42 with a plurality of screws 44.

Further, each of the end sections of the plate-like member 41 is provided with a plurality of holes 41B formed at one end or both ends of the tip portion thereof. It should be noted that the bottom plate 24 of the upper housing 21 is provided with a fixed side opening section 24A formed at the position opposed to a member side opening section 41A (see FIG. 4) of the plate-like member 41, and a plurality of internal thread holes (not shown) for fixing the plate-like member 41 formed at positions respectively opposed to the holes 41B. Further, the plate-like member 41 is fixed to the upper housing 21 by the screws (not shown) being screwed into the internal thread holes of the bottom plate 24 via the respective holes 41B.

The rotatable member 42 is provided with a rotatable member main body 421 having a roughly cylindrical shape, and a member side extension section 422 and an attaching side extension section 423, both of which are disposed so as to extend outward substantially perpendicular to the axial direction, disposed respectively at both ends of the rotatable member main body 421.

It should be noted that the top plate 36 of the lower housing 31 is provided with a pedestal 361, which has a substantially disk-like shape protruding upward, formed at substantially the center position thereof by a press forming process, and at the position in the pedestal 361 and opposed to the member side opening section 41A, there is formed an attaching side opening section 361A of a substantially circle-like shape. In other words, the member side opening section 41A, the attaching side opening section 361A, and the fixing side opening section 24A are formed to be opposed to each other.

Further, in the periphery of the attaching side opening section 361A, there are formed internal thread holes 361B for fixing the divided ring members 43 at four positions. Further, the rotatable member 42 is inserted into the attaching side opening section 361A from the upper side in the condition of being fixed to the plate-like member 41.

The divided ring members 43 are members obtained by dividing a plate-like ring member having an inside diameter roughly equal to the outside diameter of the rotatable member main body 421 into two parts, and are formed to have a thickness roughly equal to the gap between the top plate 36 and the attaching side extension section 423 in the condition in which the rotatable member 42 is inserted into the attaching side opening section 361A. Further, the divided ring members 43 are each provided with holes 43A for fixing the divided ring members 43 to the top plate 36 formed at two positions opposed to the internal thread holes 361B of the top plate 36.

Further, the divided ring members 43 are inserted into the gap between the top plate 36 and the attaching side extension section 423 so as to hold the rotatable member main body 421 therebetween, and are fixed by the screws 431 (see FIG. 6) being screwed into the internal thread holes 361B via the respective holes 43A. In other words, the divided ring members 43 have contact with the rotatable member main body 421 by the rotatable member 42 and the attaching side opening section 361A being combined in the condition in which the rotatable member 42 is inserted into the attaching side opening section 361A, and are fixed in the periphery of the attaching side opening section 361A.

In the periphery of the top plate 36, there is formed a plurality of holes 36A. Further, the lower housing 31 is provided with a top plate attaching section 311 formed so as to extend inward from the upper edges of the side faces, and the top plate attaching section 311 is provided with a plurality of internal thread holes 311A for fixing the top plate 36 formed at positions opposed to the plurality of holes 36A. Further, the top plate 36 is fixed to the lower housing 31 by the screws 362 (see FIG. 8) being screwed into the internal thread holes 311A via the plurality of holes 36A, respectively.

The rotation stopping mechanism 5 is provided with stopper sections 51A, 51B disposed at two positions, namely the right side face side (+Y-axis direction side) and the left side face side (−Y-axis direction side) in the periphery of the pedestal 361 and folded so as to project upward, and clicking springs 52A, 52B attached to two positions, namely the front face side (+X-axis direction side) and the rear face side (−X-axis direction side).

The stopper sections 51A, 51B stop the rotation of the plate-like member 41 in a predetermined direction by having contact with the plate-like member 41. Specifically, the stopper section 51A has contact with the plate-like member 41 in the condition in which the projection lens 22 in the projector main body 2 and the DVD insertion/removal port 32 in the DVD player 3 are on the same side, namely the condition shown in FIGS. 1 and 4, and stops the rotation of the plate-like member in the clockwise direction (the arrow A in FIG. 4) viewed from the upper side. Further, the stopper section 51B has contact with the plate-like member 41 in the condition in which the projection lens 22 and the DVD insertion/removal port 32 are on the sides opposite to each other, namely the condition shown in FIG. 2, and stops the rotation of the plate-like member 41 in the counterclockwise direction (the arrow B in FIG. 4).

The clicking springs 52A, 52B apply reaction force to the plate-like member 41, which acts against the rotation in the direction opposite to the predetermined direction of the rotation thus stopped by the stopper sections 51A, 51B, when the plate-like member 41 has had contact with the stopper sections 51A, 51B.

Therefore, in order for rotating the plate-like member 41 in the direction of getting away from the stopper sections 51A, 51B, it is required to apply the force greater than the reaction force applied by the clicking springs 52A, 52B. In other words, the plate-like member 41 is temporarily fixed in the condition of having contact with the stopper sections 51A, 51B. It should be noted that in the present embodiment, the temporarily fixing position in the condition in which the plate-like member 41 has contact with the stopper section 51A is defined as a first temporarily fixing position while the temporarily fixing position in the condition of having contact with the stopper section 51B is defined as a second temporarily fixing position.

Detailed Configuration of Plate-like Member and Rotatable Member

Figure 5:
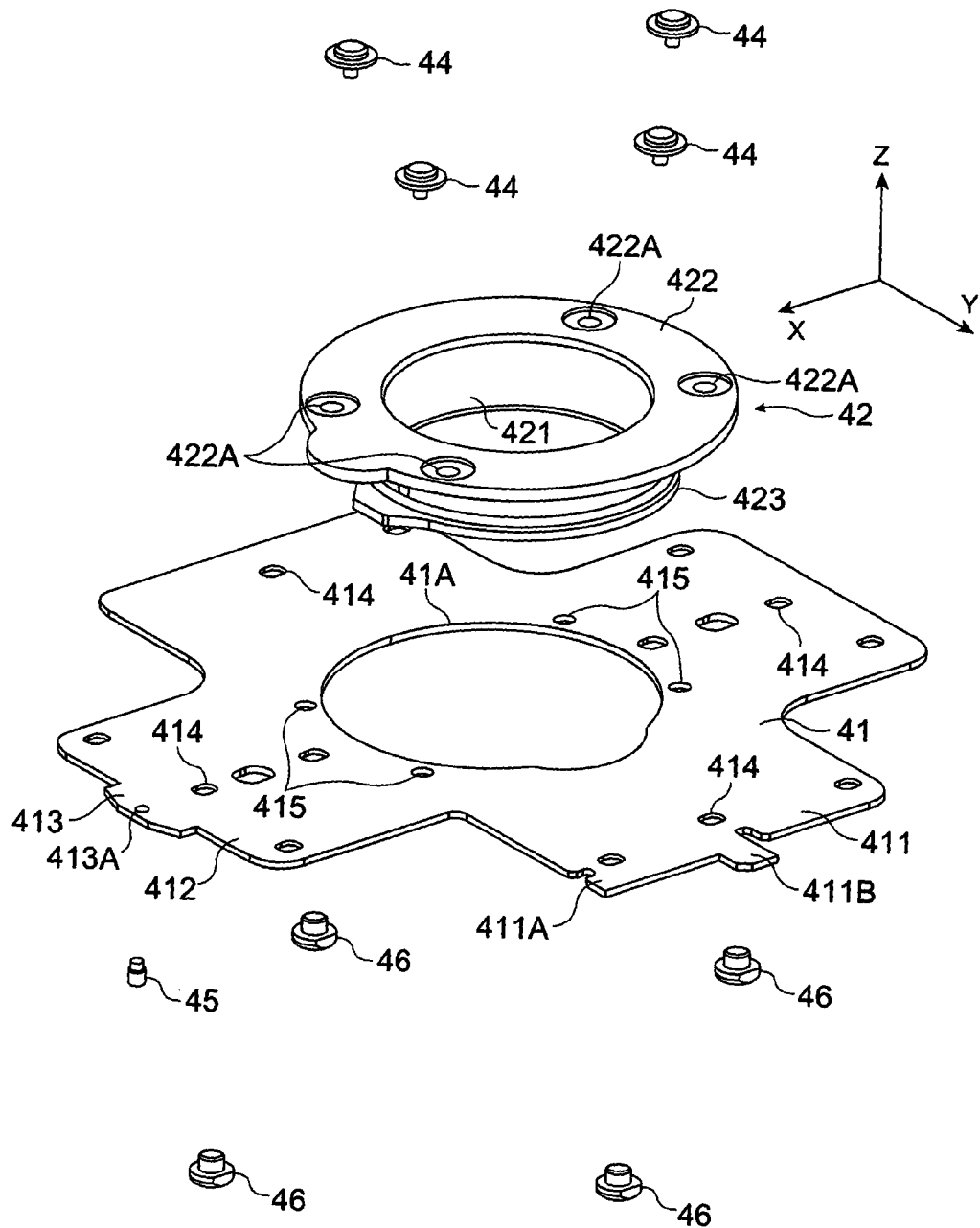
FIG. 5 is an exploded perspective view of a plate-like member and a rotatable member according to the embodiment of the invention.

FIG. 5 is an exploded perspective view of the plate-like member 41 and the rotatable member 42.

As shown in FIG. 5, an end section 411 (an end section in the +Y-axis direction side) of the plate-like member 41 is provided with contact sections 411A, 411B, which have contact with the stopper sections 51A, 51B when the plate-like member 41 rotates.

The contact section 411A is disposed on a corner section (a corner section on the +X-axis direction side) of the end section 411, and is formed linearly without being chamfered unlike in the case with corners in other end sections. Further, the contact section 411B is disposed at substantially the center section of the end section 411 so as to project outward. It should be noted that the end section 411 is provided with a step in the Y-axis direction at both side sections of the contact section 411B in order for forming the contact section 411A.

The end section 412 (the end section on the +X-axis direction side) of the plate-like member 41 is provided with a projecting section 413 disposed at substantially the center section thereof so as to project outward. At substantially the center position of the projecting section 413, there is formed a hole 413A, and a pin 45 having a substantially cylindrical shape and projecting downward is fit into the hole 413A. Further, at the substantially the center positions of the tip sections in the respective end sections of the plate-like member 41, there are formed holes 414, and a spacer 46 having a roughly hemispherical shape projecting downward is fit into each of the holes 414. The spacers 46 are made of resin with low dynamic friction coefficient such as polyacetal (POM). Further, at substantially the center position of the plate-like member 41, there is formed the member side opening section 41A with a roughly circular shape, and on the periphery of the member side opening section 41A, there are formed internal thread holes 415 for fixing the rotatable member 42 at four positions.

The member side extension section 422 of the rotatable member 42 is formed to have an outside diameter larger than the inside diameter of the member side opening section 41A, and is provided with holes 422A for fixing the rotatable member 42 formed at four positions opposed to the internal thread holes 415 of the plate-like member 41.

The attaching side extension section 423 of the rotatable member 42 is formed to have a smaller outside diameter than the inside diameters of the member side opening section 41A and the attaching side opening section 361A.

Further, the rotatable member 42 is inserted to the member side opening section 41A from the upper side, and fixed by the screws 44 being screwed respectively into the internal thread holes 415 via the holes 422A.

Figure 6:
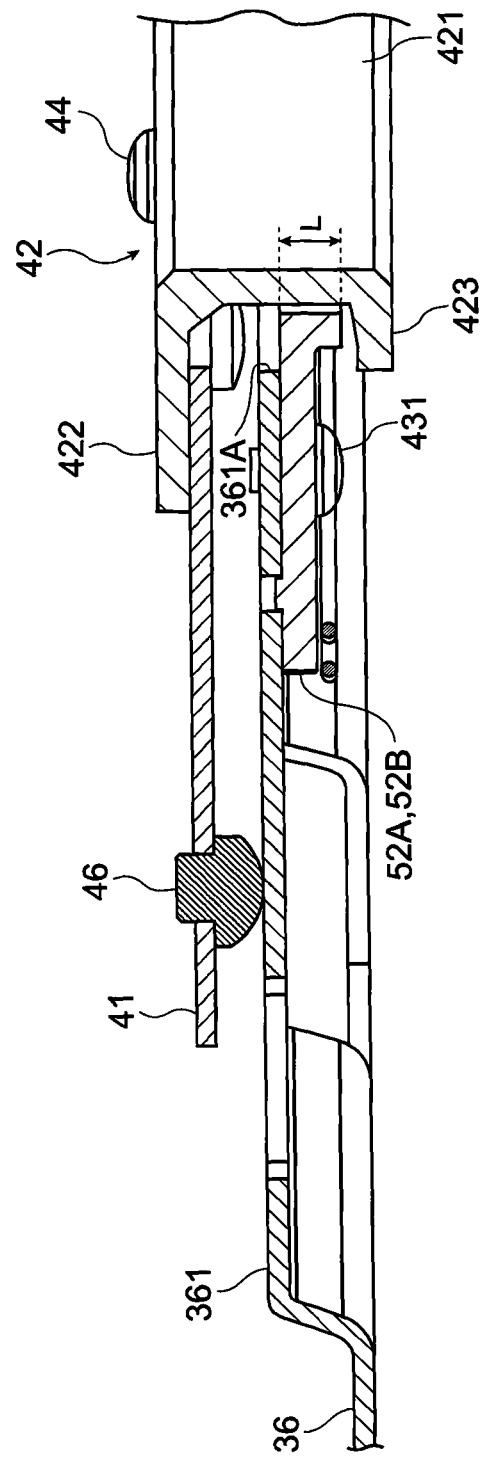
FIG. 6 is a vertical cross-sectional view showing a top plate and a connection mechanism according to the embodiment of the invention.

FIG. 6 is a vertical cross-sectional view showing the top plate 36 and the connection mechanism 4.

As shown in FIG. 6, the plate-like member 41 and the rotatable member 42 are inserted into the attaching side opening section 361A from the upper side. Each of the spacers 46 is disposed so as to be sandwiched between the plate-like member 41 and the pedestal 361, thereby assuring the gap between the plate-like member 41 and the pedestal 361, and at the same time, supporting the projector main body 2. Further, the rotatable member 42 is formed to have a length providing a gap L between the top plate 36 and the attaching side extension section 423 when inserted into the member side opening section 41A and the attaching side opening section 361A. Further, the divided ring members 43 are inserted in the gap L so as to hold the rotatable member main body 421 therebetween, and then fixed with the screws 431.

It should be noted here that the inside of the upper housing 21 and the inside of the lower housing 31 are communicated by the attaching side opening section 361A, the fixing side opening section 24A, and the rotatable member 42. Further, signal cables such as an image cable for transmitting the image information output from the DVD player 3 to the projector main body 2 and a power cable for supplying the power supply device 8 with the AC power are connected via the attaching side opening section 361A, the fixing side opening section 24A, and the rotatable member 42.

Detailed Configuration of Rotation Stopping Mechanism

Figure 7:
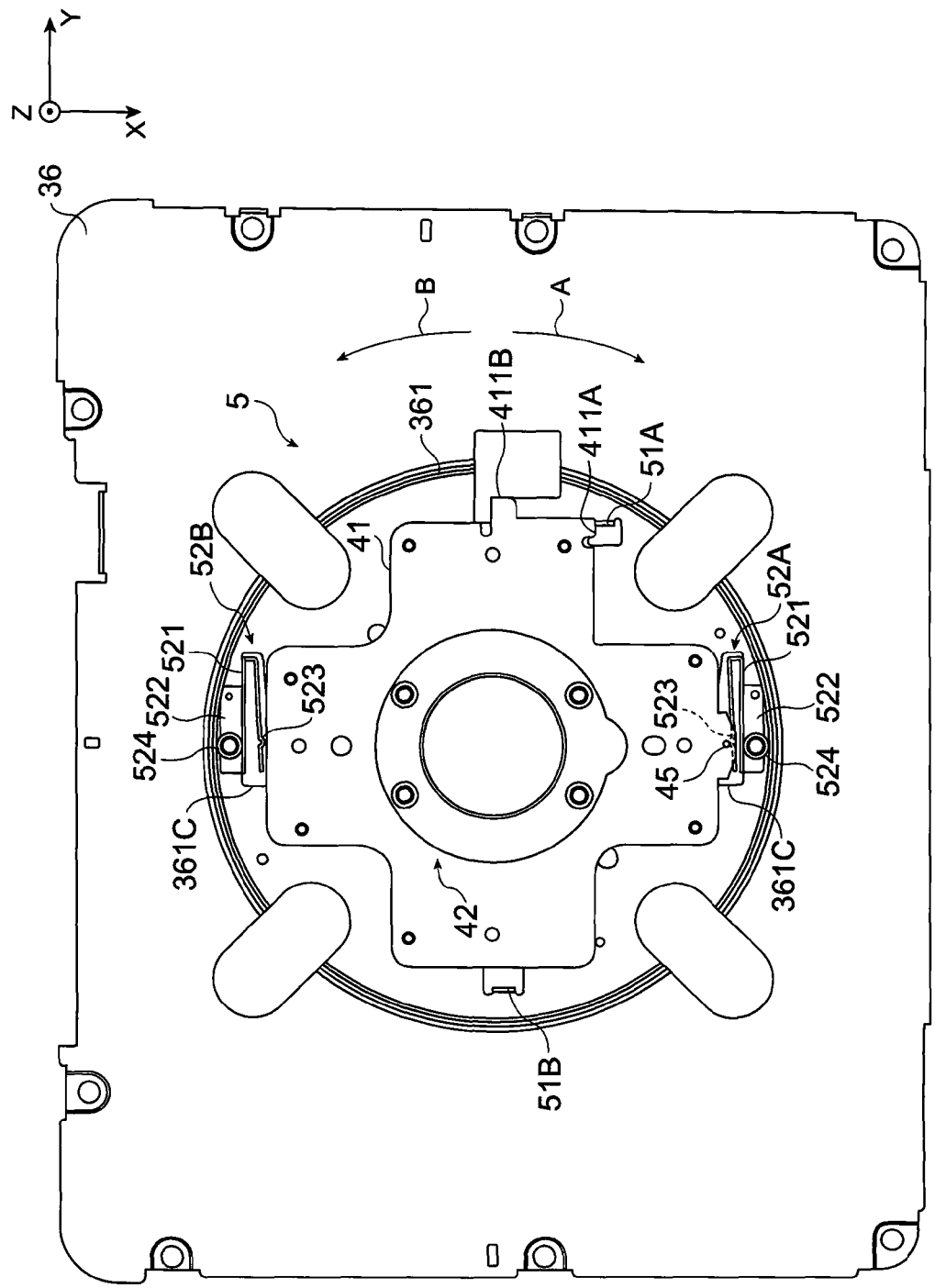
FIG. 7 is a diagram showing a rotation stopping mechanism in the condition in which the projector according to the embodiment of the invention is temporarily fixed at a first temporarily fixing position.

FIG. 7 is a diagram showing the rotation stopping mechanism 5 in the condition in which the projector 1 is temporarily fixed at the first temporarily fixing position similarly to the case shown in FIGS. 1 and 4.

As shown in FIG. 7, the stopper section 51A is disposed on the right side face side in the pedestal 361, and is located in the front side area from the center of the pedestal 361. Further, the stopper section 51B is disposed in the left side face side in the pedestal 361, and located at substantially the center of the pedestal 361 in the X-axis direction. Further, amounts of projection of the stopper sections 51A, 51B are arranged so that the positions of the tips of the stopper sections 51A, 51B are in substantially the same level as the plate-like member 41 in the condition in which the plate-like member 41 is fixed to the top plate 36.

The clicking springs 52A, 52B as reaction force application members are members made of an elastic material, and each provided with a plate spring section 521, a fixing section 522, and a locking section 523 as shown in FIG. 7.

The plate spring section 521 is a section formed to be bent to have a substantially U-shaped cross-section opening towards the tip thereof, and one of the planes of the plate spring section 521 is provided with the fixing section 522 extending substantially perpendicular to the one of the planes thereof.

It should be noted here that at two positions respectively in the front side and the rear side in the periphery of the pedestal 361, there are formed spring attaching opening sections 361C for attaching the clicking springs 52A, 52B. When attaching the clicking springs 52A, 52B to the pedestal 361, the plate spring sections 521 are inserted into the spring attaching opening sections 361C, and screws 524 are screwed into internal thread holes (not shown) formed on the periphery of the spring attaching opening section 361C on the side opposite to the rotatable member 42 via the holes (not shown) provided to the fixing sections 522, thereby the clicking springs 52A, 52B can be attached to the pedestal 361. It should be noted that the clicking springs 52A, 52B are attached to the pedestal 361 so that the tip side of each of the plate spring sections 521 faces towards the left side face side thereof. On this occasion, the rotatable member 42 side plane of each of the plate spring sections 521 is attached so as to be located inside the rotational orbit of the pin 45.

Further, as shown in FIG. 4, the clicking springs 52A, 52B are each provided with a step with a predetermined width so that the edge section of the plane in the plate spring section 521 projects upward in comparison with the fixing section 522, and in the case in which the clicking springs 52A, 52B are attached to the pedestal 361, the plane in the plate spring section 521 projects upward with a predetermined amount of projection. Further, the amount of projection is arranged to be the amount of projection with which the edge section of the plane in the plate spring section 521 is in between the plate-like member 41 and the tip of the pin 45.

The locking section 523 is a substantially semi-cylindrical section formed on the rotatable member 42 side plane of the plate spring section 521 so as to project towards the rotatable member 42 side, and is formed at the position in which the locking section 523 has contact with the pin 45 and is located on the stopper section 51A side of the pin 45 when the plate-like member 41 is at the first temporarily fixing position or the second temporarily fixing position.

Rotational Operation of Projector

The rotational operation of the projector 1 will now be explained with reference to FIGS. 8 through 10.

Figure 8:
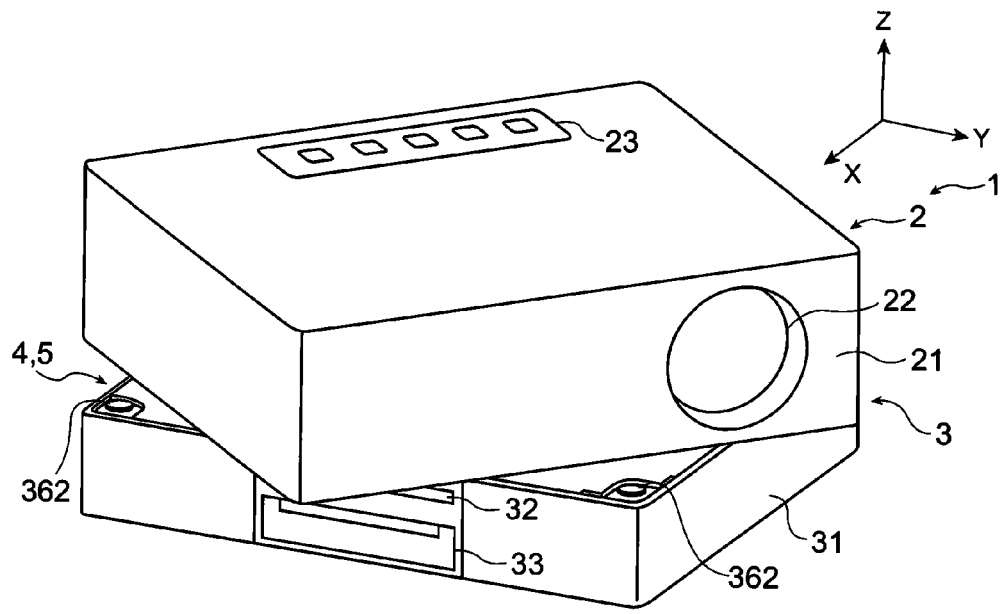
FIG. 8 is a diagram showing the condition in which the projector main body is rotated relatively to a DVD player in the projector according to the embodiment of the invention.

FIG. 8 is a diagram showing the condition in which the projector main body 2 is rotated relatively to a DVD player 3 in the projector 1. FIG. 9 is a diagram showing the condition in which the projector 1 is temporarily fixed at the second temporarily fixing position. FIG. 10 is a diagram showing the rotation stopping mechanism 5 in the condition in which the projector 1 is temporarily fixed at the second temporarily fixing position.

When predetermined torque is applied so as to rotate the projector main body 2 clockwise viewed from the upper side in the condition in which the projector 1 is temporarily fixed at the first temporarily fixing position, namely the condition shown in FIG. 1, since the plate-like member 41 is fixed to the bottom plate 24 of the projector main body 2, the predetermined torque is applied to the plate-like member 41 in the clockwise direction (the arrow A in FIG. 7) viewed from the upper side correspondingly to the rotation of the projector main body 2. However, since the stopper section 51A and the contact section 411A of the plate-like member 41 have contact with each other in the condition in which the projector 1 is temporarily fixed at the first temporarily fixing position, the rotation of the plate-like member 41 is stopped, and at the same time the rotation of the projector main body 2 is stopped.

Further, when predetermined torque is applied so as to rotate the projector main body 2 counterclockwise viewed from the upper side in this condition, since the plate-like member 41 is fixed to the bottom plate 24 of the projector main body 2, the predetermined torque is applied to the plate-like member 41 in the counterclockwise direction (the arrow B in FIG. 7) viewed from the upper side correspondingly to the rotation of the projector main body 2. Then, when the pin 45 overrides the locking section 523 of the clicking spring 52A due to the rotation of the plate-like member 41 against the bias force of the clicking spring 52A, the projector main body 2 start rotating, as shown in FIG. 8.

In other words, when the plate-like member 41 is placed at the first temporarily fixing position, the rotation in the clockwise direction viewed from the upper side is stopped by the stopper section 51A, and at the same time, the rotation in the counterclockwise direction is stopped by the clicking spring 52A. When the projector main body 2 rotates, the spacer 46 with low dynamic friction coefficient slides on the pedestal 361. Thus, the force required to rotate the projector main body 2 except the period of starting the rotation can be reduced.

It should be noted that when the projector main body 2 is rotated relatively to the DVD player 3, the screws 362 for fixing the top plate 36 to the lower housing 31 are exposed.

Figure 9:
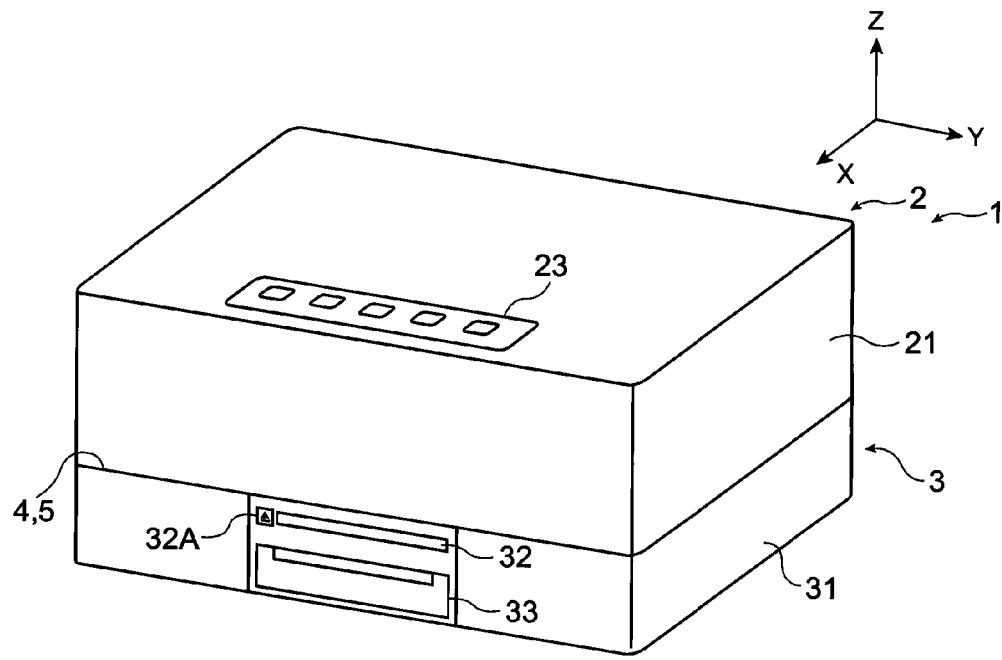
FIG. 9 is a diagram showing the condition in which the projector according to the embodiment of the invention is temporarily fixed at a second temporarily fixing position.
Figure 10:
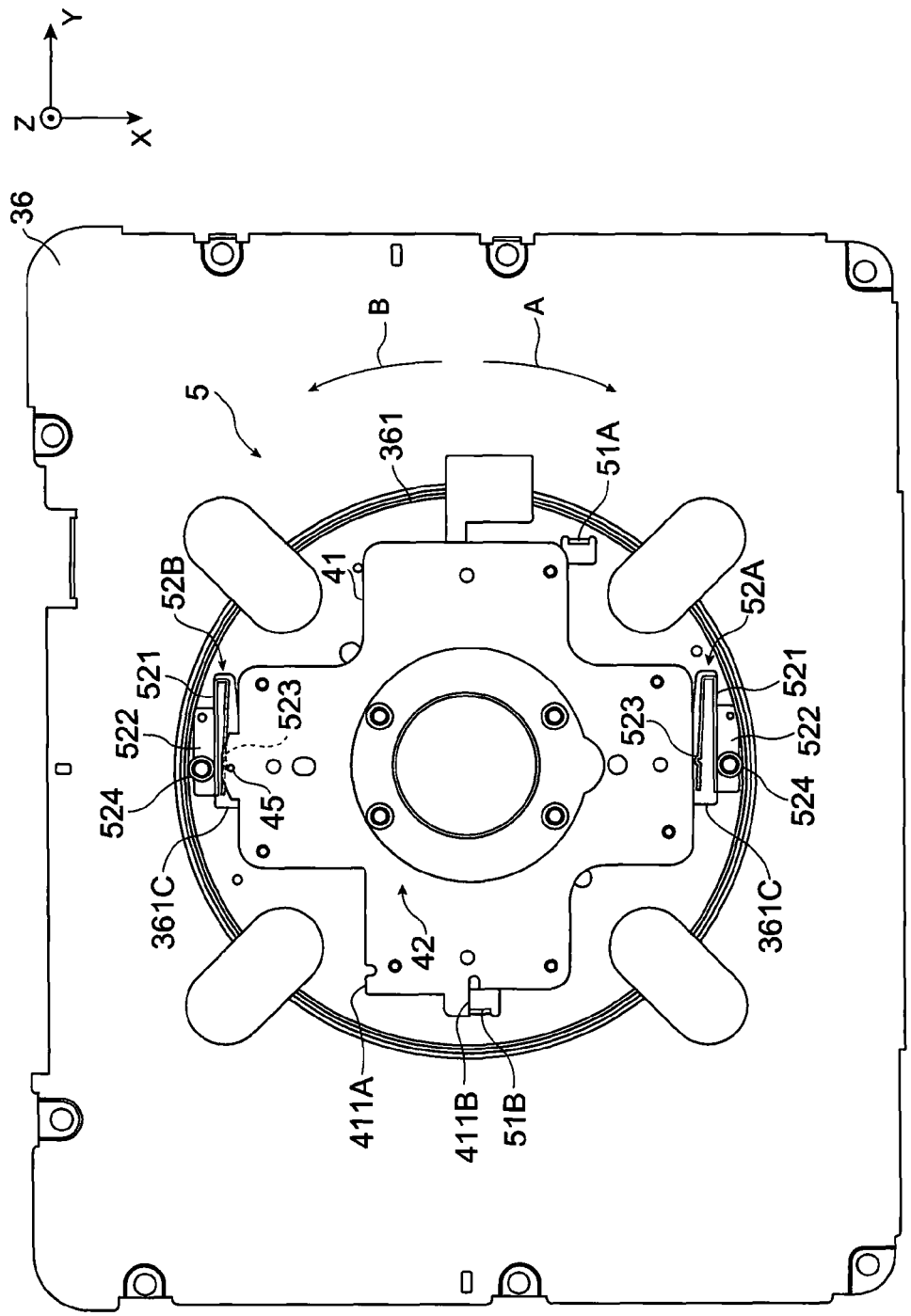
FIG. 10 is a diagram showing the rotation stopping mechanism in the condition in which the projector according to the embodiment of the invention is temporarily fixed at the second temporarily fixing position.

As shown in FIG. 9, when the projector main body 2 rotates to the second temporarily fixing position, the rotatable member 42 side plane of the plate spring section 521 of the clicking spring 52B has contact with the pin 45, thereby being pushed to come closer to the plane to which the fixing section 522 is provided, and thus biasing the pin 45 towards the rotatable member 42. Further, when the pin 45 overrides the locking section 523 of the clicking spring 52B, as shown in FIG. 10, the stopper section 51B and the contact section 411B of the plate-like member 41 have contact with each other, and the projector 1 becomes in the condition of being temporarily fixed at the second temporarily fixing position.

It should be noted that when the plate-like member 41 is placed at the second temporarily fixing position, the rotation in the counterclockwise direction viewed from the upper side is stopped by the stopper section 51B, and at the same time, the rotation in the clockwise direction is stopped by the clicking spring 52B.

According to the projector 1 related to the present embodiment, the following advantages can be obtained.

Since the connection mechanism 4 is provided with the plate-like member 41 and the rotatable member 42, the projector main body 2 can be rotated relatively to the DVD player 3. Further, since the projector 1 is provided with the rotation stopping mechanism 5, the plate-like member 41 can be temporarily fixed at predetermined positions by the stopper sections 51A, 51B, and the clicking springs 52A, 52B. Therefore, the user of the projector 1 can easily and freely change the positions of the DVD insertion/removal port 32 and the DVD operation display section 33 in accordance with the installation condition of the projector 1.

The inside of the upper housing 21 and the inside of the lower housing 31 are communicated with each other by the attaching side opening section 361A, the fixing side opening section 24A, and the rotatable member 42, and the signal cables such as the image cable for transmitting the image information output from the DVD player 3 to the projector main body 2, and the power cable for supplying the power supply device 8 with the AC power are connected via these opening sections 361A, 24A, and the rotatable member 42. Therefore, the user of the projector 1 can use the projector 1 without connecting the signal cables such as the image cable to the outside. Further, since it can be eliminated to wire around the signal cables to the outside the projector 1, space reduction can be achieved. Further, since the signal cables are connected via the space communicated by the opening sections 361A, 24A, and the rotatable member 42 formed at substantially the center section of the bottom plate 24 of the upper housing 21 and the top plate 36 of the lower housing 31, the signal cables are never entwined with each other even if when the projector main body 2 rotates, thus the projector main body 2 can smoothly be rotated.

Since the rotatable member 42 is provided with the rotatable member main body 421 and the attaching side extension section 423, and the plurality of divided ring members 43 have contact with the rotatable member main body 421 by being combined with the rotatable member 42 in the condition in which the rotatable member 42 is inserted into the attaching side opening section 361A, and is fixed to the periphery of the attaching side opening section 361A, the rotatable member 42 can be prevented from dropping out of the attaching side opening section 361A. Further, since the rotatable member main body 421 is fixed to the plate-like member 41, and at the same time, held between the divided ring members 43, the plate-like member 41 can be made rotatable along the divided ring members 43.

Since each of the spacers 46 is disposed so as to be sandwiched between the plate-like member 41 and the pedestal 361, the gap between the plate-like member 41 and the pedestal 361 can be assured, and at the same time, the projector main body 2 can be supported. Further, since the spacers 46 with a low dynamic friction coefficient slide on the pedestal 361 when the projector main body 2 rotates, the force required for rotating the projector main body 2 except the starting period of the rotation can be reduced.

Since the various interface connectors and the inlet connector 35 are provided to the DVD player 3 in the lower housing, the projector main body 2 disposed on the upper side can smoothly be rotated relatively to the DVD player 3 disposed on the lower side without entwining the cables with each other.

In the condition in which the projector main body 2 is being rotated relatively to the DVD player 3, the screws 362 for fixing the top plate 36 to the lower housing 31 are exposed. Therefore, the connection mechanism of the projector 1 can easily be disassembled. It should be noted that in order for disassembling the connection mechanism 4, firstly the projector main body 2 is rotated relatively to the DVD player 3 to expose the screws 362, and the screws 362 are removed to detach the top plate 36 from the lower housing 31. Subsequently, the screws 431 for fixing the divided ring members 43 are removed to detach the divided ring members 43 and the top plate 36 from the rotatable member 42. Then, the screws for fixing the plate-like member 41 to the upper housing 21 are removed to detach the plate-like member 41 from the upper housing 21, thereby disassembling the connection mechanism 4.

Modified Example of Embodiments

It should be noted that the invention is not limited to the embodiment described above, but includes modifications and improvements in a range where the advantages of the invention can be achieved.

Although in the embodiment the projector main body 2 is mounted on the upper side of the DVD player 3, the image output device can be mounted on the upper side of the projector the other way around.

Although in the embodiment the projector main body 2 and the DVD player 3 are disposed in a stacked manner in the vertical direction, it is also possible to dispose them adjacent to each other in a horizontal direction. In short, it is enough for the projector main body and the image output device to be disposed so as to be opposed to each other.

Although in the embodiment the DVD player 3 is exemplified as the image output device, a video player or the like, for example, can also be adopted as the image output device, and after all, any devices for outputting the image information to the projector main body can also be adopted.

Although in the embodiment, the connection mechanism 4 is provided with the plate-like member 41 fixed to the projector main body 2, and the rotatable member 42 fixed to the plate-like member 41 and attached to the DVD player 3 and for rotating the plate-like member 41 relatively to the DVD player 3, it is also possible that the connection mechanism is provided with the plate-like member fixed to the image output device, and the rotatable member fixed to the plate-like member and attached to the projector main body, and for making the plate-like member rotatable relatively to the projector main body.

Although in the embodiment, the inside of the upper housing 21 and the inside of the lower housing 31 are communicated with each other by the attaching side opening section 361A, the fixing side opening section 24A, and the rotatable member 42, the inside of the upper housing 21 and the inside of the lower housing 31 are not required to be communicated in the case in which the signal cables such as image cable are connected by wiring around the signal lines outside the projector 1.

Although in the embodiment, the rotatable member 42 is held between the divided ring members 43 fixed to the top plate 36, and the plate-like member 41 is arranged to be rotatable along the divided ring members 43, it is also possible to make the plate-like member 41 rotatable by applying, for example, a bearing. After all, it is sufficient that the plate-like member is fixed to either one of the projector main body and the image output device, and can be made rotatable relatively to the other of the projector main body and the image output device.

Although in the embodiment described above, the various interfaces and the inlet connector 35 are provided to the DVD player 3 on the lower side, the various interfaces and the inlet connector 35 can also be provided to the projector main body 2 on the upper side in such a case that it causes design difficulties to provide connectors on the lower side.

Although in the embodiment described above, the rotation stopping mechanism 5 is provided with the stopper sections 51A, 51B, and the clicking springs 52A, 52B, thereby temporarily fixing the plate-like member 41 at the first temporarily fixing position or the second temporarily fixing position, the rotation stopping mechanism can adopt other mechanisms. For example, although the clicking springs 52A, 52B are each provided with the substantially semi-cylindrical locking section 523 projecting towards the rotatable member 42 side, it is also possible that the locking section is disposed so as to project to the opposite side to the rotatable member 42, and the plate-like member is temporarily fixed by the pin 45 fitted into the locking section. It should be noted that the stopper sections and the reaction force application members can be eliminated in the case in which no limitation is provided on the rotation of the plate-like member.

Although in the embodiment described above, the image projection section 6 has the substantially L-shape in a plan view in the part from the light source device 61 to the projection lens 22, other shapes can also be adopted, and for example, it can be configured to have s substantially U-shape in a plan view.

Although in the embodiment described above, the projector 1 is configured with a three-panel projector provided with three liquid crystal panels 651, it can also be configured with a single-panel projector, for example, provided with a single liquid crystal panel. Further, it can also be configured as a projector provided with two liquid crystal panels or a projector provided with four or more liquid crystal panels.

Although in the embodiment, the transmissive liquid crystal panel having the entrance surface and the exit surface separately is used, the reflective liquid crystal panel having a common surface used as both the entrance surface and the exit surface can also be used.

Although in the embodiment described above, the optical image is formed using the liquid crystal panels, other devices than the liquid crystal panel such as a device using micromirrors can also be adopted. It should be noted that in this case, the polarization plates 652, 653 on the light beam entrance side and the light beam exit side can be eliminated.

The invention can be applied to projectors, and in particular to projectors each provided with a projector main body and an image output device more preferably.

The entire disclosure of Japanese Patent Application No. 2007-184689, filed Jul. 13, 2007 is expressly incorporated by reference herein.

What is claimed is:

1. A projector comprising:
a projector main body for modulating a light beam emitted from a light source in accordance with input image information to form an optical image, and enlargedly projecting the optical image thus formed;
an image output device for outputting the image information to the projector main body;
a connection mechanism interposed between the projector main body and the image output device, and for connecting the projector main body and the image output device to each other; and
a rotation stopping mechanism,
wherein:
the projector main body and the image output device are disposed so as to be opposed to each other,
the connection mechanism includes:
a plate-like member fixed to either one of the projector main body and the image output device, and
a rotatable member fixed to the plate-like member and rotatably attached to the other of the projector main body and the image output device, and for making the plate-like member rotatable about a fixed rotational axis relative to the rotation stopping mechanism and the other of the projector main body and the image output device, wherein a force required for rotating the one of the projector main body and the image output device, except at the starting period of rotation, is reduced;
the other of the projector main body and the image output device is provided with an attaching side opening section having a substantially circular shape disposed at a position at which the rotatable member is rotatably attached,
the rotatable member has a substantially cylindrical periphery and is inserted through the attaching side opening section and is rotatable within the attaching side opening section, and
the rotation stopping mechanism is provided to the other of the projector main body and the image output device for stopping rotation of the plate-like member, the rotation stopping mechanism being separate from the plate-like member, and includes:
a first stopper section for stopping rotation of the plate-like member in a first predetermined direction,
a second stopper section for stopping rotation of the plate-like member in a second predetermined direction that is opposite to the first predetermined direction, the plate-like member being rotatable between the first stopper section and the second stopper section;
a first reaction force application member for applying reaction force to an outer peripheral portion of the plate-like member in response to the plate-like member having contact with the first stopper section, the reaction force being generally toward the rotational axis of the plate-like member and against the rotation of the plate-like member in the second predetermined direction, and
a second reaction force application member for applying reaction force to an outer peripheral portion of the plate-like member in response to the plate-like member having contact with the second stopper section, the reaction force being generally toward a rotational axis of the plate-like member and against the rotation of the plate-like member in the first predetermined direction.

2. The projector according to claim 1,
wherein:
the rotatable member has a substantially cylindrical shape,
the plate-like member comprises a member side opening section formed at a position opposed to the attaching side opening section, the one of the projector main body and the image output device comprises a fixed side opening section formed at a position opposed to the attaching side opening section, signal cables are connected to the projector main body and the image output device, and the signal cables are connected through the attaching side opening section, the fixed side opening section, and the rotatable member.

3. The projector according to claim 1,
wherein the rotatable member includes
  a rotatable member main body having a substantially circular cross-sectional shape, and
  an extension section disposed on a tip side of an insertion direction of the rotatable member main body to the attaching side opening section so as to extend outward, and
the connection mechanism includes
  a plurality of divided ring members, each of which is a divided portion of a planar ring member having an inside diameter substantially equal to an outside diameter of the rotatable member main body,
  wherein the plurality of divided ring members have contact with the rotatable member main body by combining with each other in a condition in which the rotatable member is inserted into the attaching side opening section and is fixed to a periphery of the attaching side opening section.

4. The projector according to claim 1, further comprising a connector to which a cable is connected from outside the projector,
wherein the projector main body and the image output device are disposed so as to be stacked in a vertical direction, and
the connector is provided to one of the projector main body and the image output device disposed on the lower side of the projector.

5. The projector according to claim 1, wherein at least one of the first reaction force application member and the second reaction force application member comprises a spring.

6. The projector according to claim 1, wherein:
the first stopper section and first reaction force application member maintain the plate-like member in a first temporarily fixing position, and the second stopper section and second reaction force application member maintain the plate-like member in a second temporarily fixing position;

the plate-like member moves from the first temporarily fixing position in a direction that is opposite to the first predetermined direction by applying a force greater than the reaction force applied by the first reaction force application member; and the plate-like member moves from the second temporarily fixing position in a direction that is opposite to the second predetermined direction by applying a force greater than the reaction force applied by the second reaction force application member.

7. The projector according to claim 1, further comprising a plurality of spacers attached to the plate-like member and disposed between the plate-like member and the other of the projector main body and the image output device.

8. The projector according to claim 1, wherein the direction of the reaction force applied to the plate-like member by the first reaction force application member is generally opposite the direction of the reaction force applied to the plate-like member by the second reaction force application member.

9. The projector of claim 3, wherein
the inside diameter of each of the plurality of divided ring members is smaller than an outside diameter of the extension section of the rotatable member.

10. The projector of claim 3, wherein at least a portion of each of the plurality of divided ring members is disposed between the extension section of the rotatable member and the other of the projector main body and the image output device.

11. The projector according to claim 5, further comprising a pin extending from the plate-like member in a direction substantially perpendicular to a plane in which the plate-like member is rotated, wherein
the spring comprises a plate spring having a locking section, the locking section having a substantially semi-cylindrical shape formed on the plate spring so as to project toward the rotatable member and to have contact with the pin when the plate-like member is in contact with either the first stopper section or the second stopper section.

12. The projector according to claim 7, wherein the plurality of spacers have a substantially hemispherical shape facing downward.

13. The projector of claim 11, wherein the pin does not contact any portion of the projector other than the plate-like member when the pin is rotated between the first stopper section and the second stopper section.

* * * * *